United States Patent Office 2,809,207
Patented Oct. 8, 1957

2,809,207

LUBRICANTS COMPRISING SILICONE FLUIDS

Gordon C. Gainer, Penn Township, Allegheny County, Pa., assignor to Westinghouse Electric Corporation, East Pittsburgh, Pa., a corporation of Pennsylvania No Drawing. Application November 26, 1954, Serial No. 471,539

5 Claims. (Cl. 260—448.2)

The present invention relates to lubricating silicones and has particular reference to silicone fluids which remain liquid over a wide range of temperatures whereby they are particularly adapted for use as lubricants for moving parts in the engines of jet aircraft.

Since the turbo jet or gas turbine engine was introduced to the aircraft industry, engine manufactures have made numerous changes in design, all calculated to increase air speeds. This has been accomplished in part through reduction in size and weight of the engine per unit of thrust, but, more particularly, through increases in power plant output. One inevitable result of these design changes has been a large increase in operating temperatures. Jet aircraft operate at extremely high altitudes where temperatures of −65° F. and below frequently are encountered. The engine and lubricants therefor also are subjected to extremely high temperatures, particularly after the aircraft lands and the engine ceases operating. In this last case, heat from the red hot turbine rotor soaks back along the shaft to the main bearings where the lubricant is subjected to "frying" temperatures of 400° F. and higher.

The lubrication of moving parts in jet engines operating under load at such high and low temperature extremes has presented a problem difficult to solve. Petroleum base lubricants, even highly refined petroleum base products, have not proved to be completely satisfactory.

A modified linear dimethyl silicone fluid having the formula

FORMULA I

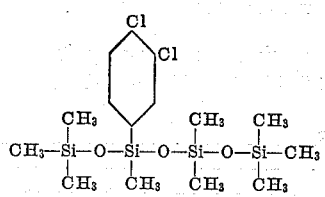

has been proposed for use as a lubricant in jet engines. This type of fluid derives improved lubricating properties from the presence of the dichlorophenyl group attached to silicon. While this silicone fluid has met with some success, it has the disadvantages of a relatively high freezing point and a relatively high viscosity at temperatures near its freezing point. The introduction of additional dimethyl siloxy groups into the molecule effectively lowers the freezing point of the fluid but has the disadvantage of reducing its lubricating properties materially and increasing slightly the viscosity of the fluid. Also, it has been found that while the introduction of additional dichlorophenyl groups into the molecule improves the lubricating properties of the fluid, it also increases the viscosity and freezing point of the fluid to an undesirable degree.

The object of the present invention is to provide antifriction silicone fluid lubricants having outstandingly low freezing points, extremely low viscosities at temperature of −65° F. and below, and the ability to withstand temperatures of 400° F. and higher for relatively long periods of time without decomposing.

Another object of the invention is to provide an efficacious method for lubricating metal to metal surfaces by applying thereto a linear dimethyl silicone lubricant capable of fluid flow at temperatures from −65° F. and below to more than 400° F.

Other and further objects of the invention will, in part, be obvious and will, in part, appear hereinafter.

I have discovered that the foregoing objects are attained in a fluid silicone lubricant having the formula:

FORMULA II

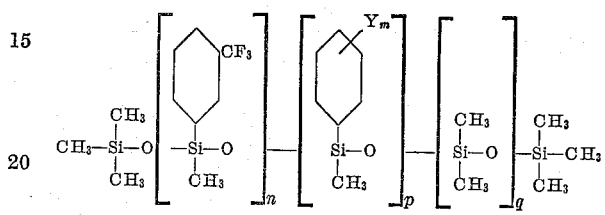

wherein Y represents at least one substituent selected from the class consisting of chlorine, bromine, and fluorine, $m$ is an integer having a value of from 1 to 4, $n$ and $p$ each have values of at least one and a sum equal to 3, and $q$ is an integer having a value of from 3 to 10.

Such fluid linear silicone lubricants, which include m-trifluoromethylphenyl groups in combination with halogen substituted phenyl groups, have unexpected and unique properties of extremely low freezing points and low viscosities and improved lubricating properties.

A comparison of Formulae I and II, set forth hereinabove, indicates that the silicone lubricants of this invention (Formula II) contain

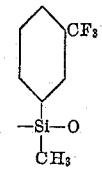

groups which are not present in the prior art lubricant (Formula I). The presence of this group in the fluid provides a lubricant having a lower freezing point, a lower viscosity, and increased lubricating properties.

Specific examples of halogen substituents represented by $Y_m$ in Formula II, set forth hereinabove include x,x-dichloro; 3,4-dichloro; and x,x,x-trichloro.

To indicate even more fully the advantages and capabilities of the fluid silicone lubricants of the present invention, the following examples are set forth.

*Example I*

A mixture was made up containing 39 grams (0.15 mole) of commercially prepared x,x-dichlorophenylmethyldichlorosilane, 41.7 grams (0.15 mole) of m-trifluoromethylphenylmethyldiethoxysilane, 59.2 grams (0.4 mole) of dimethyldiethoxysilane, and 16.2 grams (0.1 mole) of hexamethyldisiloxane. The mixture was added with stirring to 300 ml. of 5% sulfuric acid in an excess of cracked ice. After stirring for several hours, the aqueous solution was separated from the silicone layer and discarded. Thereafter, an equal volume of 75% sulfuric acid was added to the layer of silicone fluid remaining, the addition being carried out over a period of about five minutes with rapid stirring, care being taken to prevent the temperature from rising above 25° C. After all the acid had been added the emulsion-like product resulting was stirred for a period of about one hour at 20° C. to 25° C. after which time a large excess of cracked ice and diethyl ether was added. The silicone layer which separated from an aqueous acid layer was withdrawn and washed five times with cold water. The washed silicone fluid was neutralized with a sodium bicarbonate solution and then dried over a mixture of anhydrous sodium sulfate and anhydrous potassium carbonate. The anhydrous fluid was then heated at a temperature of about 155° C. for three hours at a pressure of 1–2 mm. mercury to remove unreacted components and low boiling constituents.

The resulting silicone fluid was a mixture of molecules substantially all of which had the formula

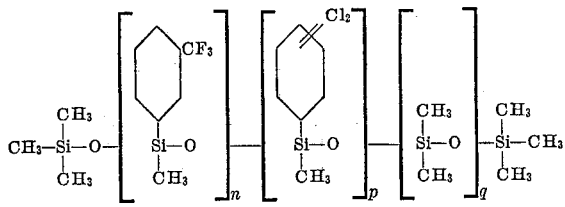

wherein $n$ had an average value of 1.5, $p$ had an average value of 1.5, and $q$ had an average value of 4. Each molecule comprised at least one m-trifluoromethylphenylmethylsiloxy radical, at least one dichlorophenylmethylsiloxy radical, and at least three dimethylsiloxy radicals.

This silicone fluid had a freezing point of approximately —94° F. and the following viscometric properties:

Viscosity: Centistokes
210° F _____ 4.99
100° F _____ 18.01
—40° F _____ 3,000.00
—65° F _____ 40,000.00

The lubricating ability of the silicone fluid then was tested in the Shell Four Ball E. P. Test for steel against steel with the following data being obtained:

Applied load (kg.): Average scar diameter (mm.)
20 _____ 0.32
30 _____ .44
40 _____ .52
50 _____ .70
60 _____ .68
70 _____ .73
80 _____ .79
85 _____ 1.61
90 _____ 2.14
95 _____ 1.79
100 _____ .96
110 _____ 2.34
120 _____ 2.38
130 _____ Weld It was determined by this test that the silicone fluid had an immediate seizure value of 90 kg. and a weld point of 130 kg. One of the best petroleum base lubricants in use at the present time has an immediate seizure value of 70 kg. and a weld point of 120 kg. in this test; consequently, the fluid silicone of this invention is a better lubricant for use in jet engines than the petroleum base lubricant now employed.

*Example II*

A fluid silicone was prepared similar to that described in Example I with the exception that it did not contain any m-trifluoromethylphenyl groups in the linear chain. In preparing this fluid silicone lubricant, a monomer mixture containing 78 grams (0.3 mole) of the same commercially prepared x,x-dichlorophenylmethyldichlorosilane as was used in Example I, 59.2 grams (0.4 mole) of dimethyldiethoxysilane, and 16.2 grams (0.1 mole) of hexamethyldisiloxane was hydrolyzed and equilibrated with sulfuric acid in accordance with the procedure described in Example I. After vacuum treatment there was obtained a fluid silicone having a freezing point of —65° F. and the following viscometric properties:

Viscosity: Centistokes
210° F _____ 4.94
100° F _____ 22.65
—20° F _____ 4,000.00
—30° F _____ 11,600.00
—40° F _____ 28,000.00

In the Shell Four Ball E. P. Test this fluid had an immediate seizure value of approximately 80 kg. and a weld point of 120 kg.

A comparison of the properties of the silicone fluids of Examples I and II indicates that by substituting a relatively small amount of m-trifluoromethylphenylsiloxane groups for an equivalent number of dichlorophenylmethylsiloxane groups has the desirable effect of lowering the freezing point of the fluid and, at the same time, providing a fluid of extremely low viscosity having improved lubricating properties. Similar effects are illustrated below in a comparison of Examples III with IV and Examples V with VI.

*Example III*

A monomer mixture was made up containing 26.0 grams (0.1 mole) of x,x-dichlorophenylmethyldichlorosilane, 55.6 grams (0.2 mole) of m-trifluoromethylphenylmethyldiethoxysilane, 59.2 grams (0.4 mole) of dimethyldiethoxysilane and 16.2 grams (0.1 mole) of hexamethyldisiloxane. The mixture was hydrolyzed and equilibrated and then heated under vacuum according to the procedure described in Example I.

The resulting silicone fluid was a mixture of molecules substantially all of which had the formula

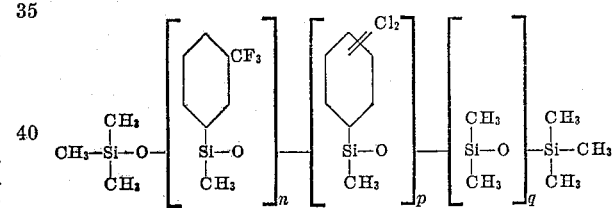

wherein $n$ had an average value of 2, $p$ had an average value of 1, and $q$ had an average value of 4. Each molecule comprised at least one m-trifluoromethylphenylmethylsiloxy radical, at least one x,x-dichlorophenylmethylsiloxy radical, and at least three dimethylsiloxy radicals.

This silicone fluid had a freezing point of —87° F. and the following viscometric properties:

Viscosity: Centistokes
210° F _____ 5.69
100° F _____ 22.18
—40° F _____ 4,700.00
—65° F _____ 68,000.00

The following lubricating data was obtained when this fluid was tested in the Shell Four Ball E. P. Test for steel against steel:

Applied load (kg.): Average scar diameter (mm.)
20 _____ .24
30 _____ .33
40 _____ .44
50 _____ .48
60 _____ .69
70 _____ .67
80 _____ .76
90 _____ 1.92
100 _____ .88
110 _____ 2.21
120 _____ Weld The fluid had an immediate seizure value of 90 kg. and a weld point of 120 kg.

Example IV

A fluid silicone was prepared in a manner similar to that described in Example III with the exception that it did not contain any m-trifluoromethylphenyl groups in the linear chain. In preparing this fluid, a monomer mixture containing 0.3 mole of x,x-dichlorophenylmethyldichlorosilane from the same commercially prepared batch as used in Example III, 0.4 mole of dimethyldiethoxysilane, and 0.1 mole of hexamethyldisiloxane was hydrolyzed and equilibrated in accordance with the procedure described in the foregoing examples. After vacuum treatment there was obtained a fluid silicone having a freezing point of —35° F. and the following viscometric properties:

Viscosity: Centistokes
- 210° F —— 9.56
- 100° F —— 61.56
- —20° F —— 33,000.00

The following data was obtained when this fluid was tested in the Shell Four Ball E. P. Test for steel against steel.

| Applied load (kg.): | Average scar diameter (mm.) |
|---|---|
| 20 | .30 |
| 30 | .46 |
| 40 | .49 |
| 50 | .64 |
| 60 | .99 |
| 70 | 1.09 |
| 80 | 1.11 |
| 90 | 1.12 |
| 100 | 2.16 |
| 110 | 2.50 |
| 120 | Weld |

The fluid had an immediate seizure of approximately 100 kg. and a weld point of 120 kg.

Example V

A monomer mixture containing 27.9 grams (0.1 mole) of 3,4 - dichlorophenylmethyldichlorosilane, 55.6 grams (0.2 mole) of m-trifluoromethylphenylmethyldiethoxysilane, 59.2 grams (0.4 mole) of dimethyldiethoxysilane, and 16.2 grams (0.1 mole) of hexamethyldisiloxane was hydrolyzed, equilibrated, and then heated under vacuum in accordance with the procedure described in Example I.

The resulting silicone fluid was a mixture of molecules substantially all of which had the formula

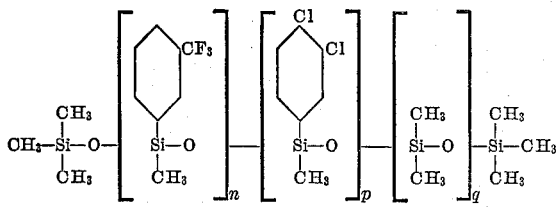

where $n$ had an average value of 2, $p$ had an average value of 1, and $q$ had an average value of 4. Each molecule comprised at least one m-trifluoromethylphenylmethylsiloxy radical, at least one 3,4-dichlorophenylmethylsiloxy radical, and at least three dimethylsiloxy radicals.

This silicone fluid had a freezing point of —78° F. and the following viscometric properties:

Viscosity: Centistokes
- 210° F —— 3.77
- 100° F —— 14.97
- —40° F —— 6,600.00
- —65° F —— 141,200.00

When this fluid was tested in the Shell Four Ball E. P. Test for steel against steel the following data was obtained.

| Applied load (kg.): | Average scar diameter (mm.) |
|---|---|
| 20 | .28 |
| 30 | .30 |
| 40 | .42 |
| 50 | .47 |
| 60 | .66 |
| 70 | .87 |
| 80 | .79 |
| 90 | .91 |
| 100 | .96 |
| 110 | .82 |
| 120 | .85 |
| 130 | .87 |
| 140 | Weld |

The fluid had an immediate seizure value and a weld point of 140 kg.

Example VI

A fluid silicone was prepared similar to that described in Example V with the exception that it did not contain any m-trifluoromethylphenyl groups in the linear chain. In preparing this fluid, a monomer mixture containing 83.7 grams (0.3 mole) of 3,4-dichlorophenylmethyldichlorosilane, 59.2 grams (0.4 mole) of dimethyldiethoxysilane, and 16.2 grams (0.1 mole) of hexamethyldisiloxane was hydrolyzed and equilibrated as described in Example I. A fluid silicone was obtained on vacuum treatment which had a freezing point of —52° F. and the following viscometric properties:

Viscosity: Centistokes
- 210° F —— 5.30
- 100° F —— 25.30
- —40° F —— 70,700.00

When tested in the Shell Four Ball E. P. Test for steel against steel this fluid was found to have the following lubricating properties:

| Applied load (kg.): | Average scar diameter (mm.) |
|---|---|
| 20 | .30 |
| 30 | .51 |
| 40 | .57 |
| 50 | .96 |
| 60 | .98 |
| 70 | 1.11 |
| 80 | .97 |
| 90 | 1.14 |
| 100 | 1.16 |
| 110 | 1.15 |
| 120 | 1.18 |
| 130 | 1.24 |
| 140 | 1.19 |
| 150 | Weld |

This fluid had an immediate seizure value and a weld point of 150 kg.

Example VII

A fluid silicone is prepared in accordance with the procedure described in Example I with the exception that an equal molar proportion of p-bromophenylmethyldichlorosilane is employed in place of the x,x-dichlorophenylmethyldichlorosilane. The resulting silicone fluid has a low freezing point and viscosity, and possesses excellent lubricating properties.

Example VIII

A silicone lubricant is prepared according to the method of Example V except that an equal molar proportion of 3,4-difluorophenylmethyldichlorosilane is substituted for the 3,4-dichlorophenylmethyldichlorosilane. An excellent lubricant having a low freezing point and viscosity is obtained.

The foregoing examples illustrate that the inclusion of varying amounts of m-trifluoromethylphenylsiloxane groups into a linear silicone fluid containing varying amounts of halogen substituted phenyl groups has the desirable effect of lowering the freezing point of the silicone fluid and, at the same time, providing a silicone lubricant of extremely low viscosity which has improved lubricating properties.

While the invention has been described with reference to particular examples and embodiments thereof, it will be understood, of course, that changes, substitutions and modifications may be made therein without departing from its true scope.

I claim as my invention:

1. A liquid linear polysiloxane having the formula

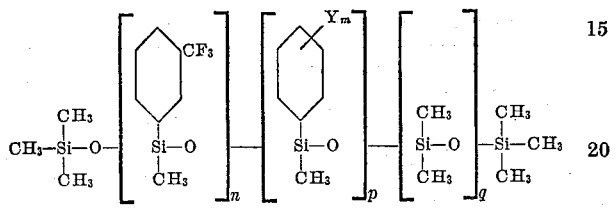

wherein Y represents at least one substituent selected from the class consisting of chlorine, bromine, and fluorine, $m$ is an integer having a value of from 1 to 4, $n$ and $p$ each have values of at least one and a sum equal to 3, and $q$ is an integer having a value of from 3 to 10.

2. A fluid silicone lubricant having the formula

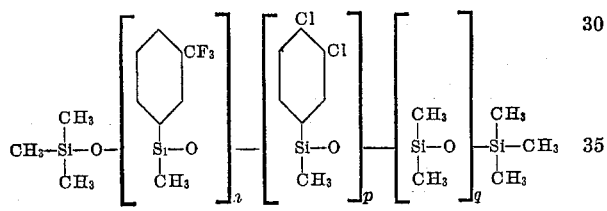

where $n$ and $p$ each have values of at least one and a sum equal to 3, and $q$ is an integer having a value of from 3 to 10.

3. A fluid silicone lubricant having the average formula

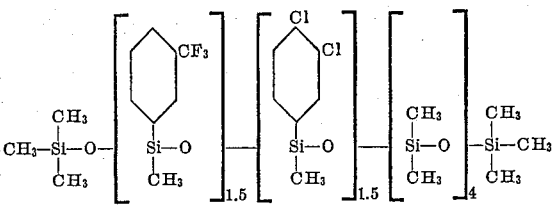

4. A fluid silicone lubricant having the average formula

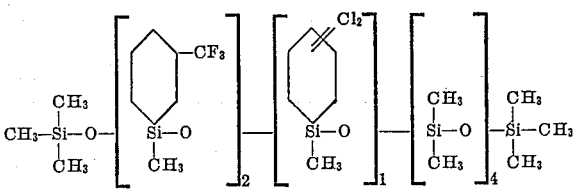

5. A fluid silicone lubricant having the average formula

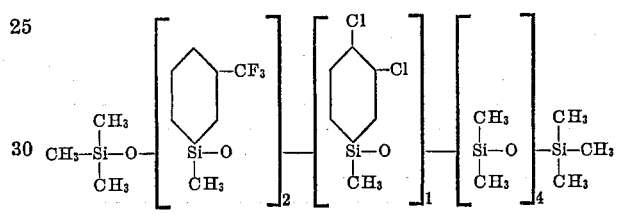

References Cited in the file of this patent

UNITED STATES PATENTS

| | | |
|---|---|---|
| 2,640,066 | Kohl | May 26, 1953 |
| 2,689,859 | Burkhard | Sept. 21, 1954 |

FOREIGN PATENTS

| | | |
|---|---|---|
| 502,052 | Belgium | Apr. 14, 1951 |